US009780582B2

(12) United States Patent
Schmid et al.

(10) Patent No.: US 9,780,582 B2
(45) Date of Patent: Oct. 3, 2017

(54) RESTART PROTECTION FOR BATTERY-OPERATED ELECTRICAL UNITS

(75) Inventors: Markus Schmid, Wolfschlugen (DE); Thilo Koeder, Bayan Lepas (MY)

(73) Assignee: ROBERT BOSCH GMBH, Stuttgart (DE)

( * ) Notice: Subject to any disclaimer, the term of this patent is extended or adjusted under 35 U.S.C. 154(b) by 1184 days.

(21) Appl. No.: 13/575,011

(22) PCT Filed: Dec. 29, 2010

(86) PCT No.: PCT/EP2010/070862
§ 371 (c)(1),
(2), (4) Date: Oct. 2, 2012

(87) PCT Pub. No.: WO2011/091935
PCT Pub. Date: Aug. 4, 2011

(65) Prior Publication Data
US 2013/0026857 A1    Jan. 31, 2013

(30) Foreign Application Priority Data

Jan. 29, 2010   (DE) .................. 10 2010 001 372

(51) Int. Cl.
*F16P 3/20*        (2006.01)
*H02J 7/00*        (2006.01)
(Continued)

(52) U.S. Cl.
CPC .............. *H02J 7/0036* (2013.01); *H02J 7/00* (2013.01); *H02J 7/0045* (2013.01); *H02J 7/02* (2013.01); *A63F 13/00* (2013.01)

(58) Field of Classification Search
CPC ....... F16P 3/20; F16P 3/08; F16P 3/14; G11B 33/02; A01D 34/828; H01M 10/46;
(Continued)

(56) References Cited

U.S. PATENT DOCUMENTS 6,646,845 B1*  11/2003  Turner ................... H02J 9/002
                                                       307/10.7
7,053,567 B2*   5/2006  Yamamoto .............. B25B 21/00
                                                       173/178
(Continued)

FOREIGN PATENT DOCUMENTS

CN       101051678       10/2007
EP       2 106 885       10/2009
(Continued)

OTHER PUBLICATIONS

International Search Report for PCT/EP2010/070862, dated Sep. 7, 2011.

*Primary Examiner* — Rexford Barnie
*Assistant Examiner* — Jagdeep Dhillon
(74) *Attorney, Agent, or Firm* — Norton Rose Fulbright US LLP; Gerard Messina

(57) ABSTRACT

A protective system for an electric unit operated by an installable battery pack includes: a control device configured to activate the electric unit in the case of the installed battery pack by operating a main switch; a contact device of the electric unit and a contact device of the battery pack including mutually complementary contact elements, which in each case form a first and a second interface for producing a first and a second electrical connection between the electric unit and the battery pack. In this instance, the contact devices are configured, during the installing of the battery pack, to produce the first electrical connection before the second electrical connection in time.

10 Claims, 4 Drawing Sheets

(51) Int. Cl.
*H02J 7/02* (2016.01)
*A63F 13/00* (2014.01)

(58) Field of Classification Search
CPC .......... B25B 23/147; B25B 21/00; H02J 7/00;
B25F 5/00; A63F 5/00; A63F 9/24; H02P
5/00
USPC ...... 307/328, 43, 66, 80; 320/115, 110, 114;
173/182, 181, 186, 179; 340/680, 679,
340/507
See application file for complete search history.

(56) References Cited

U.S. PATENT DOCUMENTS

| | | | | | |
|---|---|---|---|---|---|
| 7,285,934 | B2* | 10/2007 | Chang | ................. | H01M 2/1022 320/107 |
| 7,629,766 | B2* | 12/2009 | Sadow | ................. | H02J 7/0044 173/217 |
| 2002/0100597 | A1 | 8/2002 | Numata | | |
| 2003/0155890 | A1* | 8/2003 | Roepke | ................. | H02J 7/0032 320/114 |
| 2006/0220612 | A1* | 10/2006 | Feldmann | ................ | B25F 5/022 320/114 |
| 2008/0070703 | A1* | 3/2008 | Campo | ............... | G07F 17/3202 463/46 |
| 2008/0192889 | A1* | 8/2008 | Rohde | ................. | G01N 23/223 378/45 |
| 2009/0135029 | A1* | 5/2009 | Ladouceur | ............ | G06F 3/0213 341/23 |
| 2010/0127661 | A1* | 5/2010 | Stocking | ............... | H02J 7/0044 320/115 |
| 2010/0147545 | A1* | 6/2010 | Hirt et al. | ..................... | 173/182 |
| 2010/0315041 | A1* | 12/2010 | Tan | ....................... | H02J 7/0044 320/115 |

FOREIGN PATENT DOCUMENTS

| | | |
|---|---|---|
| FR | 2 613 270 | 10/1988 |
| JP | 2008-80420 | 8/2008 |

* cited by examiner

RESTART PROTECTION FOR BATTERY-OPERATED ELECTRICAL UNITS

BACKGROUND OF THE INVENTION

1. Field of the Invention

The present invention relates to a protective system for an electric unit powered by an exchangeable battery pack. The protective system prevents an unintentional restart of the electric unit after a change of the battery pack. The present invention also relates to an electric unit having such a protective system.

2. Description of the Related Art

Electrically operated units, such as a handheld machine tool, have to be supplied for the intended operation with the electrical power required for that purpose. For a network-independent and thus flexible use of such electric units, the power supply may take place using batteries. In the case of handheld machine tools, rechargeable batteries are frequently used, which are developed as compact battery packs. These battery packs, also known as accumulator packs, are mounted detachably in an appropriate accommodating device of the respective unit, in order to enable external charging or an exchange of the battery pack.

In order to connect the battery pack to the electric unit, contact elements that are complementary to each other are present on both parts. The contact elements form interfaces both to current supply of the electric unit and to a data exchange between battery and electric unit. During battery installation, the battery pack is pushed into the battery accommodating device of the electric unit, which causes the two parts to be connected to each other. As soon as the main contacts of the battery pack make contact with the main contacts on the electric unit, the current supply of the electric unit is established. If the main switch of the electric unit is already switched on at this point, the electric unit is activated upon installation of the battery pack, which is able to lead to an unintended restart. Furthermore, in this usual electric unit, spark formation may lead to typical manifestations of wear at the contact elements, since the contacting of the main contacts does not take place without current when the main switch is on.

BRIEF SUMMARY OF THE INVENTION

It is an object of the present invention, in an electric unit, powered by a battery pack, to prevent an unintended restart after a change of the battery pack.

According to the present invention, a protective system is provided for an electric unit powered by an installable battery pack, including a control device, the control device being developed to activate the electric unit, when the battery pack is installed, by operating a main switch. The electric unit, in this instance, includes a contact device having a plurality of contact elements which, upon installation of the battery pack, contact corresponding contact elements of a contact device of the battery pack, in order to produce a first and a second electrical connection between the electric unit and the battery pack, the first electric connection being formed with the aid of mutually complementary first contact elements and the second electric connection with the aid of mutually complementary second contact elements. In this instance, the contact devices are developed, during installation of the battery pack, to produce the first electrical connection before the second electrical connection in time. The control device, on the other hand, is developed to suppress the activation of the electric unit, provided the first electric connection is produced before the second electrical connection in time, in the case of an operated switch. Thereby an effective restart protection is implemented, which prevents an inadvertent restart of the electric unit after a battery change. Moreover, spark formation is prevented by this, sparks being usually created upon the insertion of the battery pack into a switched-on machine. Because of this, the contacts of the battery pack and of the electric unit are effectively protected from wear.

In a first specific embodiment, it is provided that the control device is developed to deactivate the electric unit, provided, in the case of an operated main switch, the second electrical connection is separated before the first electrical connection, in time. Thereby an automatic switching off function is implemented, by the aid of which the power electronics system is switched off in the case of the removal or the falling out of the battery pack from the running machine. Since the unplugging of the battery pack takes place in a currentless or powerless manner, and therefore spark formation is avoided, the contacts on the battery pack and the electric unit are effectively protected from wear.

In one additional specific embodiment of the present invention, it is provided that at least one contact element of the second interface of a contact device is situated spatially offset from the contact elements of the first interface of the respective contact device in the plug-in direction of the battery pack. Thereby a delay in time may be achieved in a particularly simple way during the contacting of the contact elements of the first and second interface, and with that, during the producing of the first and second electrical connection.

One additional specific embodiment provides that at least one contact element of the second electrical interface of a contact device is developed to be shorter than the contact elements of the first interface of the corresponding contact device. With the aid of this alternative measure, too, a delay in the contacting of the contact elements of the two interfaces, and thus during the production of the first and second electrical connection, may be implemented very simply.

According to one additional specific embodiment, a mechanical delay device is provided, which is developed to delay in time the establishment of the second electrical connection while the battery pack is being installed. Thereby one is able to ensure that the desired delay during the establishment of the two electrical connections takes place independently of the plug-in speed of the battery pack.

In a further specific embodiment, a mechanical release device is provided, by which at least one contact element of the second electrical connection is mechanically blocked as soon as the battery pack is uninstalled. In this context, the mechanical release device is developed to release the blocked contact element, delayed in time, after the production of the first electrical connection. Because of the mechanical blockage of the contact elements, the contacting sequence is able to be assured in a particularly simple and effective manner. Furthermore, one is able to implement thereby a mechanical protection of exposed contact elements in the case of the uninstalled battery pack.

In a further specific embodiment, an electrical release device is provided, by which at least one contact element of the second electrical connection is electrically blocked as soon as the battery pack is uninstalled. In this context, the electrical release device is developed to release the blocked contact element, delayed in time, after the production of the first electrical connection. This alternative measure, too, makes possible a sufficient delay in time during the production of the two electrical connections.

According to one additional specific embodiment, the electrical release device includes at least one switch, which interrupts the circuit of the second electrical connection during the uninstalling of the battery pack. With the aid of the switch, the establishment of the second electrical connection is able to take place independently of the contacting of the contact elements. In particular, as is the case in an additional specific embodiment, one is able to operate the switch using an interlocking mechanism which is used for securing the battery pack on the housing of the electric unit. Since the latching mechanism is usually operated only after the complete pushing of the battery pack into the corresponding accommodating device, it is ensured, thereby, that the second electrical connection is produced, delayed in time, after the first electrical connection.

In another specific embodiment, it is provided that the first electrical connection is used for the power supply of the electric unit by the battery pack, while the second electrical connection is developed as a communications connection between the battery pack and the electric unit. In the initiation process of the control device set in operation by the installation of the battery pack, one is able to determine, with the aid of a scanning of the communications interface, that would take place anyway in this instance, that the battery was installed with the main switch on. With that, one is able to implement the concept according to the present invention in existing electric units, without great effort.

Finally, according to still another specific embodiment, the control device is developed to activate the electric unit, if the switch is operated anew, after the activation of the electric unit during the installation of the battery pack has been suppressed. Thereby it is assured that only one activating, undertaken by the user, and thus also intended, of the electric unit actually leads to its start.

DETAILED DESCRIPTION OF THE INVENTION

Figure 1:
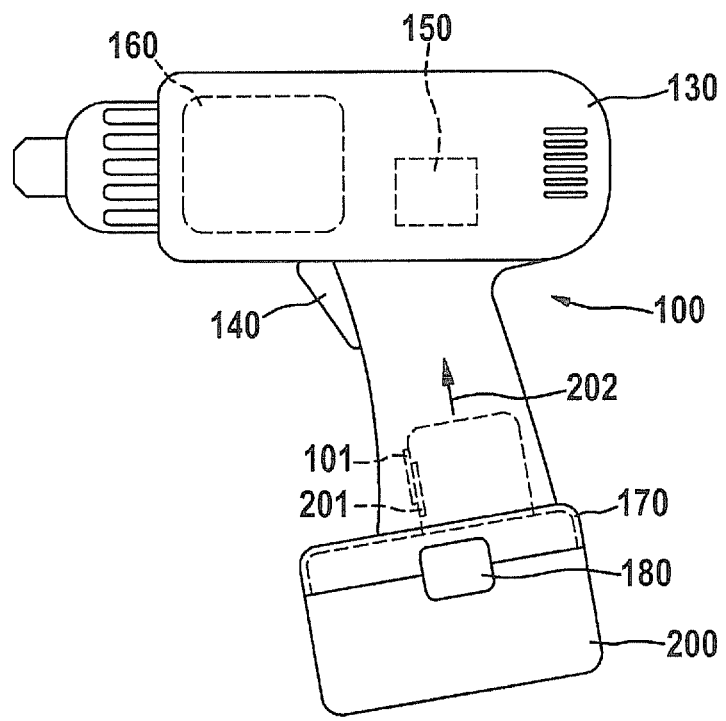
FIG. 1 shows an electric unit according to the present invention, in exemplary fashion, having an installed battery pack.

FIG. 1 shows an electric unit 100, which is operated using an installable battery pack 200. Electric unit 100, developed preferably as a handheld machine tool, such as a battery-operated screw driver, a battery-operated drill or a similar machine, has a housing 130, in which a power part 160 is accommodated, in the present case an electric motor. Furthermore, electric unit 100 includes a control device 150 for controlling power part 160, as well as a main switch 140 in the form of an operating element for activating electric unit 100. The current supply of electric unit 100 takes place via a battery pack 200, which is installed on, or rather in housing 130 of electric unit 100. In order to make possible a simple battery change, battery pack 200 is preferably mounted on housing 130 in an easily detachable manner. In the present example, a special accommodating device 170 is situated for this in the lower region of a housing part used as a holding grip, of battery-operated screw driver 100. The installation of battery pack 200 takes place by plugging it into the corresponding accommodating device 170, in the present example, the front part of battery pack 200, which includes a contact device 201, is pushed into the handle in push-in direction 202 indicated by an arrow, formed by the hand grip of electric tool 100. In a corresponding manner, within the scope of a battery change, battery pack 200 is removed from accommodating device 170, the front part of battery pack 200 being pulled out in the opposite direction from the handle-shaped hand grip. To connect battery pack 200 to electric unit 100, accommodating device 170 also includes a contact device 101. Each of the two contact devices 101, 201 includes a plurality of contact elements, which interact with correspondingly complementarily formed contact elements of the opposite side. The contact elements of a contact device 101, 201 each form a first interface for producing a current connection, as well as a second interface for producing a communications connection. According to the present invention, the contact elements are developed in at least one of the two contact devices 101, 202 in such a way that, during the pushing of battery pack 200 into accommodating device 170, the communications connection is produced delayed in time with respect to the current connection.

In the mounted position, battery pack 200 is usually protected against falling out of accommodating device 170 by the use of a latching mechanism 180. Latching mechanism 180 may include latching elements, for example, in this instance, which, when reaching the mounted position, engage in appropriate undercuts (not shown here).

Control device 150 is developed so as to put electric motor 160 into operation, provided main switch 140 is being operated, in the case of an installed battery pack 200. In order to prevent electric unit 100 from accidentally starting up at operated main switch 140 during the installation of battery pack 200, the electric unit is furnished with a protective system 102. Protective system 102 includes a special contact device, in which, by a suitable development of the contact elements, in at least one of the two contact devices 101, 201, a delay is implemented during the setup of the communications connection, compared to the current connection. Furthermore, protective system 102 includes a control device which detects the battery installation in light of the delay during the setup of the communications connection, and in this case forestalls the activation of electric unit 100. In the present example, this function is implemented within control unit 150 of electric unit 100. This control function may basically also be implemented in a separate control unit of electric unit 100 or of battery pack 200.

Figure 2:
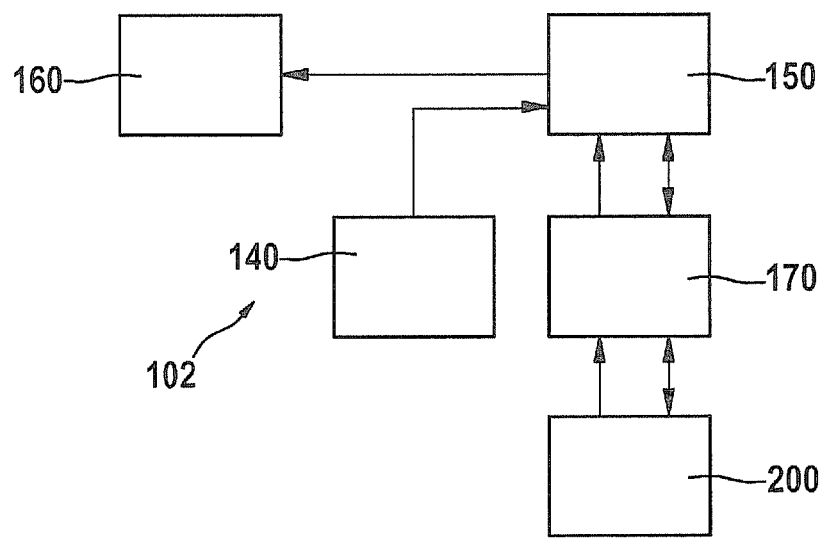
FIG. 2 shows schematically, a protective system according to the present invention, of the electric unit shown in FIG. 1.

A schematic representation of protective system 102 is shown in FIG. 2. It becomes clear, in this instance, that battery pack 200 is electrically connected via corresponding interfaces to the contact device of accommodating device 170.

In this context, a first electric connection, which is usually used for power supply, and is implemented using two main contacts at the battery pack and the electric unit, is shown using a single arrow. Moreover, a second electrical connection, which is developed, for example, as a bidirectional communications connection, is shown with the aid of a corresponding arrow. Accommodating device 170 is connected to control device 150 via corresponding lines. Both the communications signals and the supply voltage are passed on to control device 150 via these lines. Main switch 140 is also connected via appropriate lines to control device 150, which scans the current switching status of main switch 140. Alternatively, the power supply may also be conducted to the control device via the main switch. Finally, control device 150 is electrically connected via corresponding lines to power component 160 of electric unit 100, so as to activate power component 160, using appropriate signals, according to the specified operating state.

In order to detect the installation of the battery pack, and, in the case of activated main switch 140 being able to forestall the activation of power unit 160, the concept according to the present invention provides a delay in setting up the communications connection with respect to the power connection. Such a delay may be achieved in various ways. In particular, a suitable delay is made possible by the special design or situation of the contact elements in electric unit 100 and/or on battery pack 200.

Figure 3:
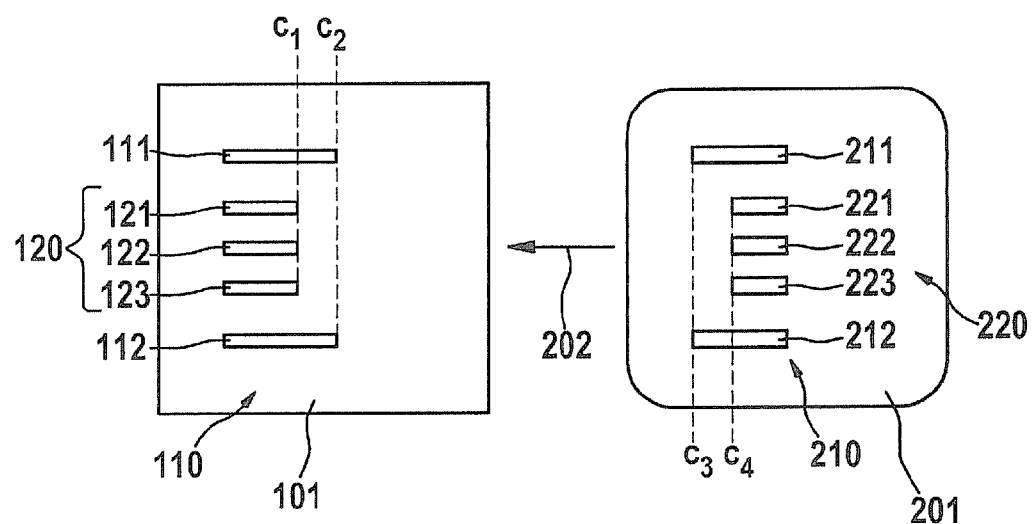
FIG. 3 shows a first specific embodiment of a contact device according to the present invention of the electric unit in FIG. 1 and the associated battery pack.

FIG. 3 shows such a contact system in exemplary fashion, the contact elements of the communications connection being developed to be shorter than the contact elements of the power connection. Contact device 101 of electric unit 100 and its complementary contact device 201 of battery pack 200 are shown in this connection. Contact device 101 on the unit side includes five contact elements 111, 112, 121, 122, 123, that are situated side-by-side in parallel, the two outer contact elements 111, 112 representing the current interface 110 of electric unit 100, while inner contact elements 121, 122, 123 form communications interface 120 of electric unit 100. In an analogous way, contact device 201 on the battery side includes five contact elements 211, 212, 221, 222, 223, that are situated side-by-side in parallel, the two outer contact elements 211, 212 representing the power supply interface 210, while inner contact elements 221, 222, 223 form communications interface 220. In the present example, the contact elements of communications interface 120 on the unit side are developed to be shorter compared the contact elements of current interface 110 on the unit side, so that two contact lines $c_1$, $c_2$ come about, that are offset with respect to each other in regard to plug-in direction 202. Also, in contact device 201 on battery pack 200, that is complementary to this, contact elements 221, 222, 223 of communications interface 220 are developed to be shorter than associated main contacts 211, 212, so that, in this case too, two contact lines $c_3$, $c_4$ come about, that are offset with respect to each other in regard to plug-in direction 202.

Figure 4:
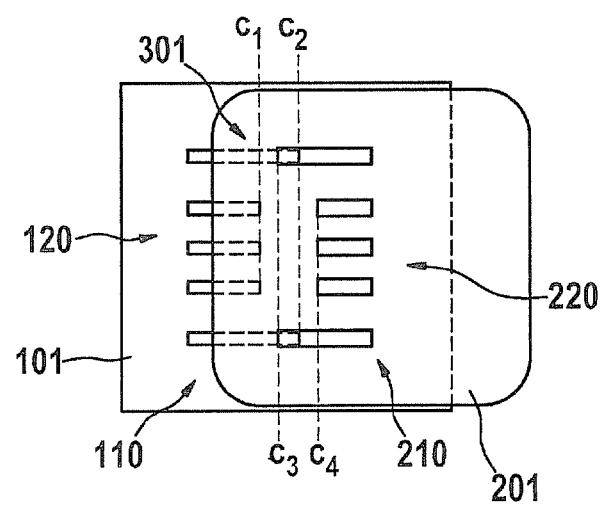
FIG. 4 shows the contact device of FIG. 3 during the installation process of the battery pack.
Figure 5:
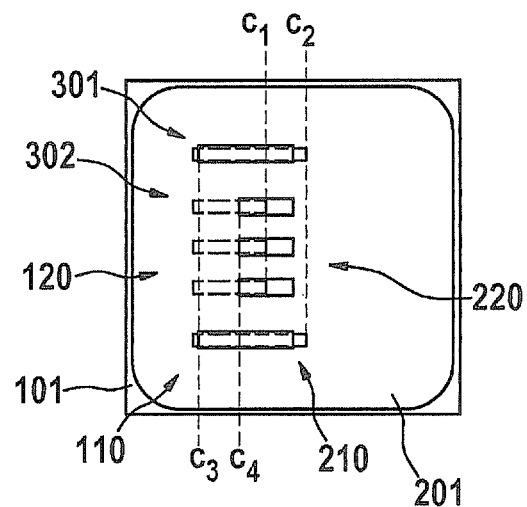
FIG. 5 shows the contact element configuration from FIGS. 3 and 4 while having an installed battery pack.

Because of the different contact lines of interfaces 110 and 120, as well as 210 and 220, when the battery pack is pushed into the accommodating device, first the longer contact elements of the two power interfaces 110, 210 come into contact with one another. This is depicted in FIG. 4. As soon as the power supply of the electric unit is produced, control device 150 begins a start-up procedure in which communications interface 120 is also scanned. Since the communication connection is not yet established at this time, the measured signals lie outside the specified range, which is evaluated by control device 150 as an error. In this case, control device 150 suppresses the activation of electric unit 100, provided main switch 140 is operated at this point in time or has already been switched on. Since the power electronics system is not activated, electric motor 160 of electric unit 100 is not set in motion. In order to manage an effective restart protection, it is meaningful to suppress the activation of electric unit 100 and the activation of the power electronics even when, by a further pushing in of battery pack 200 into accommodating device 170, finally the contact elements of the two communications interfaces 110, 210 also come into contact with one another. FIG. 5 shows a corresponding situation, in which battery pack 200 has been completely pushed into accommodating device 170. In order to take up operation, control device 150 has to be unlocked. This may take place, for example, due to a renewed operation of main switch 140. Depending on the application, it may be meaningful to provide additional measures for delaying the setup or rather the production of the communications connection. Thus, an additional mechanical delay may be implemented, for example, by the use of which the time required for booting up the microprocessor is managed independently of the pushing-in speed of the battery pack. In this connection, a mechanical release device is also possible for the contact elements of a communications interface 120, 220. With the aid of this release device (not shown here) individual or all contact elements of corresponding communications interface 120, 220 are blocked using mechanical means, and are released for contacting only after the contacting of the main contacts But even using electronic means, one is able to implement a corresponding setup of the communications connection. Thus, for instance, with the aid of an electrical release device, which interrupts the circuit of one or more contact elements of one of the two communications interfaces 120, 220, and closes the circuit again only after the contacting of the main contacts, an additional delay is made possible in producing the communications connection. Such an electronic release may be implemented, for example, using a switch in the circuit of the communications connection. It may be operated, in this instance, using the locking mechanism for securing battery pack 200 in accommodating device 170.

The release devices described here may be implemented, in this instance, both in electric unit 100 and in battery pack 200.

Figure 6:
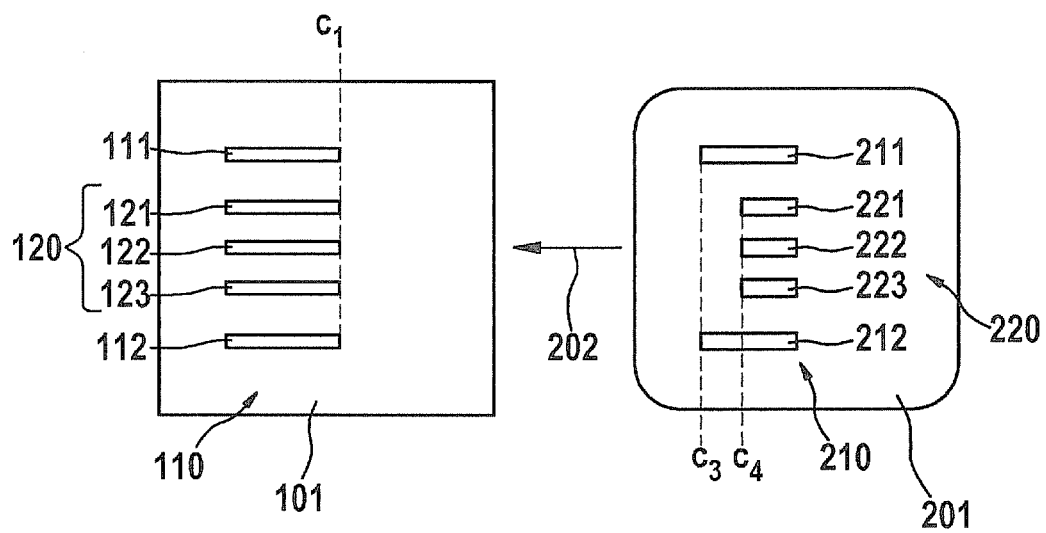
FIGS. 6 to 8 show additional exemplary embodiments of contact configurations according to the present invention, each having differently developed contact elements.
Figure 7:
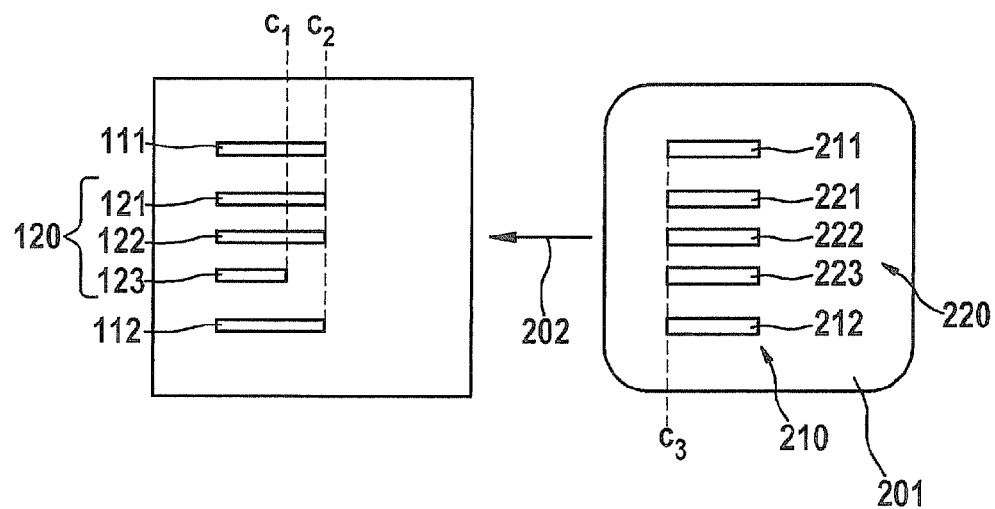
Figure 8:
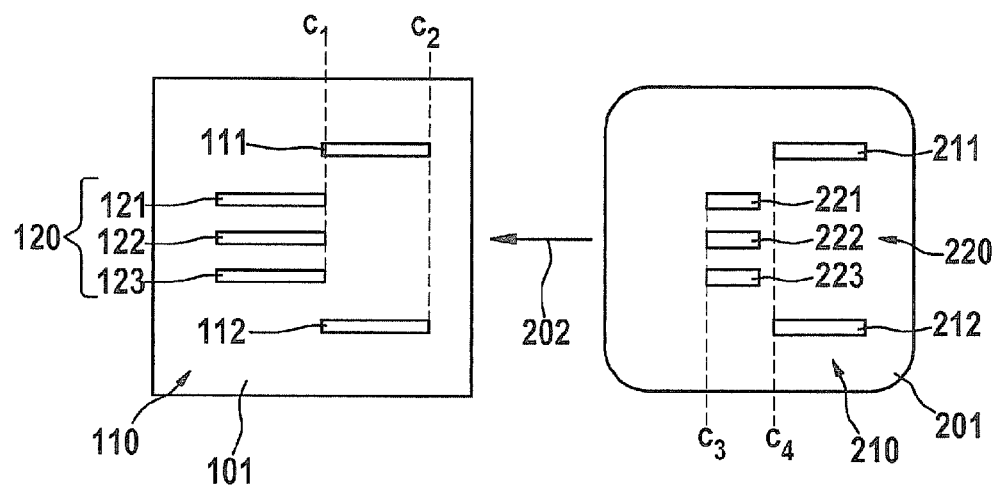

The following FIGS. 6 to 8 show additional exemplary embodiments for the shaping of the contact elements of the two contact devices 101, 201, in order to achieve a delay in setting up the two electrical connections 301, 302 between electric unit 100 and battery pack 200. In the arrangement shown in FIG. 6, only in contact device 201, on the battery side, are the contact elements of communications interface 220 developed to be shorter, compared to associated main contacts 211, 212 of current interface 210. The contact elements of contact device 101 on the unit side, on the other hand, are developed to be of the same length, so that a common contact line $c_1$ comes about. Analogously to this, one might also only modify the contact elements of contact device 101, on the unit side, according to the present invention, while the contact elements of contact device 201, on the battery side, have a common contact line.

Such a case is shown in FIG. 7. By contrast to the contact device of FIG. 3 on the unit side, in the present exemplary embodiment only one of three contact elements of communications interface 120 is developed shorter. This is intended to make it clear that not all contact elements of communications interface 120 have to be modified so as to make possible the certain detection of the installation process.

In the two exemplary contact arrangements of FIGS. 6 and 7, since contact device 101, 102 is modified in only one of the two connection partners, electric unit 100 or battery pack 200, it is possible to accommodate the complete protective system 102 in the respective connection partners 100, 200. By doing this, one is able to implement compatibility with existing machines or battery packs. Thus, on the one hand, an electric unit 100, which includes an appropriately developed control device 150 as well as a contact device 101, that is modified according to the present invention, is also able to be operated according to the present invention using a usual battery pack. On the other hand, a battery pack 200, which has a corresponding control device as well as a contact device 201 that is developed according to the present invention, is able to collaborate with usual electric units within the meaning of the present invention.

Besides using the contact elements shaped of different lengths that are shown in preceding FIGS. 3 through 7, a delay in the setup of communications connection 302 is also made possible by shifting the contact elements along an axis parallel to the push-in direction 202. FIG. 8 shows, for example, a contact arrangement according to the present invention, in which the desired delay is implemented both by a variation of the contact element length and by a different positioning of the contact elements.

The specific embodiments, explained with the aid of the figures, represent only preferred or exemplary specific embodiments of the present invention. Besides the specific embodiments described and illustrated, additional specific embodiments are conceivable, which may include further modifications as well as combinations of features. In particular, the contact elements shown in this instance, may be any contacts, such as sliding contacts, friction contacts or plug contacts. The number of contact elements of an interface is also described only in exemplary fashion, in this instance. Furthermore, the term "battery pack" used here, besides the usual batteries and so-called accumulator packs, also includes all sorts of exchangeable power supply sources, such as fuel cells.

What is claimed is:

1. A protective system for an electric unit operated using an installed battery pack, comprising:
   a control device configured to activate the electric unit having the installed battery pack by operating a main switch; and
   a first contact device of the electric unit and a second contact device of the battery pack, the first and second contact devices each having at least one first contact element and at least one second contact element, wherein the at least one first contact element of the first contact device and the at least one first contact element of the second contact device form a first interface to produce a first electrical connection between the electric unit and the battery pack, and wherein the at least one second contact element of the first contact device and the at least one second contact element of the second contact device form a second interface to produce a second electrical connection between the electric unit and the battery pack;
   a mechanical delay device configured to delay in time the establishment of the second electrical connection with respect to the first electrical connection while the battery pack is being installed,
   wherein the first and second contact devices are configured to produce, upon installing of the battery pack, the first electrical connection prior to the second electrical connection, and wherein the control device is configured to suppress activation of the electric unit if both (i) the first electrical connection is produced prior to the second electrical connection, and (ii) the main switch is operated,
   wherein the first electrical connection supplies power to the electric unit from the battery pack, and the second electrical connection is configured as a communications connection between the battery pack and the electric unit,
   wherein the control device is configured to detect the installing of the battery and suppress activation of the electric unit pack based at least in part on the delay in time of the establishment of the second electrical connection.

2. The protective system as recited in claim 1, wherein the control device is configured to deactivate the electric unit if both (i) the second electrical connection is disconnected before the first electrical connection, and (ii) the main switch is operated.

3. The protective system as recited in claim 1, wherein at least one contact element forming the second interface is situated spatially offset with respect to the contact elements forming the first interface in the plug-in direction of the battery pack.

4. The protective system as recited in claim 1, wherein at least one contact element forming the second interface is configured to be shorter than the contact elements forming the first interface.

5. The protective system as recited in claim 1, further comprising:
   a mechanical release device configured to mechanically block at least one contact element forming the second interface, as soon as the battery pack is uninstalled, wherein the mechanical release device is configured to release the blocked contact element after the establishment of the first electrical connection.

6. The protective system as recited in claim 1, further comprising:
   an electrical release device configured to electrically block at least one contact element forming the second interface, as soon as the battery pack is uninstalled, wherein the electrical release device is configured to release the blocked contact element after the establishment of the first electrical connection.

7. The protective system as recited in claim 6, wherein the electrical release device includes at least one switch which interrupts the second electrical connection during the uninstalling of the battery pack.

8. The protective system as recited in claim 7, wherein the at least one switch of the electrical release device is operated with the aid of a locking mechanism, and wherein the battery pack is secured to a housing of the electric unit with the aid of the locking mechanism.

9. The protective system as recited in claim 1, wherein the control device is configured to activate the electric unit in the case the main switch is operated again after the suppression of the activation of the electric unit during the installing of the battery pack.

10. An electric system, comprising:
    an electric motor;
    a main switch;
    a control device configured to activate the electric motor with the aid of an installed battery pack by operating the main switch; and
    a first contact device of the electric motor and a second contact device of the battery pack, the first and second contact devices each having at least one first contact element and at least one second contact element, wherein the at least one first contact element of the first contact device and the at least one first contact element of the second contact device form a first interface to produce a first electrical connection between the electric motor and the battery pack, and wherein the at least one second contact element of the first contact device and the at least one second contact element of the second contact device form a second interface to produce a second electrical connection between the electric motor and the battery pack;

a mechanical delay device configured to delay in time the establishment of the second electrical connection with respect to the first electrical connection while the battery pack is being installed, wherein the first and second contact devices are configured to produce, upon installing of the battery pack, the first electrical connection prior to the second electrical connection, and wherein the control device is configured to suppress activation of the electric motor if both (i) the first electrical connection is produced prior to the second electrical connection, and (ii) the main switch is operated, wherein the first electrical connection supplies power to the electric unit from the battery pack, and the second electrical connection is configured as a communications connection between the battery pack and the electric unit, wherein the control device is configured to detect the installing of the battery and suppress activation of the electric unit pack based at least in part on the delay in time of the establishment of the second electrical connection.

* * * * *